(12) United States Patent
Favaretto

(10) Patent No.: US 9,893,339 B2
(45) Date of Patent: Feb. 13, 2018

(54) SYSTEM FOR THE STORAGE OF ELECTRIC ENERGY FOR A VEHICLE WITH ELECTRIC PROPULSION AND HAVING CYLINDRICAL CHEMICAL BATTERIES CONNECTED TO EACH OTHER IN PARALLEL AND IN SERIES BY MEANS OF U-SHAPED RIGID CONNECTION ELEMENTS

(71) Applicant: Ferrari S.p.A., Modena (IT)

(72) Inventor: Fabrizio Favaretto, Formigine (IT)

(73) Assignee: Ferrari S.p.A., Modena (IT)

( * ) Notice: Subject to any disclaimer, the term of this patent is extended or adjusted under 35 U.S.C. 154(b) by 310 days.

(21) Appl. No.: 14/390,101

(22) PCT Filed: Apr. 5, 2013

(86) PCT No.: PCT/IB2013/052742
§ 371 (c)(1),
(2) Date: Oct. 2, 2014

(87) PCT Pub. No.: WO2013/150499
PCT Pub. Date: Oct. 10, 2013

(65) Prior Publication Data
US 2015/0155543 A1    Jun. 4, 2015

(30) Foreign Application Priority Data

Apr. 6, 2012   (IT) .............................. BO2012A0183

(51) Int. Cl.
*H01M 2/20*     (2006.01)
*H01M 10/0525*  (2010.01)
(Continued)

(52) U.S. Cl.
CPC ............. *H01M 2/206* (2013.01); *B60L 1/003* (2013.01); *B60L 1/02* (2013.01); *B60L 3/0007* (2013.01);
(Continued)

(58) Field of Classification Search
CPC ........ H01M 2/206; H01M 2/024; H01M 2/12; H01M 2/34; H01M 10/425; H01M 10/525
See application file for complete search history.

(56) References Cited

U.S. PATENT DOCUMENTS

| | | | |
|---|---|---|---|
| 2011/0159339 A1* | 6/2011 | Gregor | H01M 2/06 429/120 |
| 2012/0003508 A1* | 1/2012 | Narbonne | H01M 2/1077 429/8 |

(Continued)

FOREIGN PATENT DOCUMENTS

| | | |
|---|---|---|
| CN | 102386359 A | 3/2012 |
| DE | 10 2007 010 742 A1 | 8/2008 |

(Continued)

*Primary Examiner* — Stewart A Fraser
*Assistant Examiner* — Rachel L Zhang
(74) *Attorney, Agent, or Firm* — Blank Rome LLP

(57) ABSTRACT

A system for the storage of electric energy for a vehicle with electric propulsion; the storage system is provided with: a pack of chemical batteries, each of which has a cylindrical shape having a central symmetry axis and presents, at one end, a positive pole and, at an opposite end, a negative pole; the batteries are arranged in at least one row, in which all the chemical batteries of the row are parallel to each other and are arranged one next to the other with a predetermined pitch; and with a plurality of electrical connection elements for connecting the poles of the chemical batteries of a same row, so as to create groups of chemical batteries, in which the chemical batteries are connected to each other in parallel, (Continued)

and so as to connect the groups of chemical batteries to each other in series.

13 Claims, 11 Drawing Sheets

(51) Int. Cl.
*H01M 10/42* (2006.01)
*H01M 2/34* (2006.01)
*H01M 2/02* (2006.01)
*H01M 2/12* (2006.01)
*B60L 11/18* (2006.01)
*H01M 2/10* (2006.01)
*H01M 10/48* (2006.01)
*B60L 1/00* (2006.01)
*B60L 1/02* (2006.01)
*B60L 3/00* (2006.01)
*B60L 3/04* (2006.01)
*B60L 11/14* (2006.01)
*H01M 10/625* (2014.01)
*H01M 10/613* (2014.01)
*B60K 1/04* (2006.01)
*H01M 10/653* (2014.01)
*H01M 10/6555* (2014.01)
*H01M 10/643* (2014.01)

(52) U.S. Cl.
CPC .............. *B60L 3/0046* (2013.01); *B60L 3/04* (2013.01); *B60L 11/14* (2013.01); *B60L 11/1864* (2013.01); *B60L 11/1874* (2013.01); *B60L 11/1877* (2013.01); *B60L 11/1879* (2013.01); *H01M 2/024* (2013.01); *H01M 2/1077* (2013.01); *H01M 2/1094* (2013.01); *H01M 2/12* (2013.01); *H01M 2/1223* (2013.01); *H01M 2/34* (2013.01); *H01M 10/425* (2013.01); *H01M 10/482* (2013.01); *H01M 10/486* (2013.01); *H01M 10/613* (2015.04); *H01M 10/625* (2015.04); *B60K 1/04* (2013.01); *B60L 2240/545* (2013.01); *B60L 2270/145* (2013.01); *H01M 10/0525* (2013.01); *H01M 10/643* (2015.04); *H01M 10/653* (2015.04); *H01M 10/6555* (2015.04); *H01M 2010/4271* (2013.01); *H01M 2200/00* (2013.01); *H01M 2220/20* (2013.01); *Y02E 60/122* (2013.01); *Y02T 10/70* (2013.01); *Y02T 10/7005* (2013.01); *Y02T 10/7061* (2013.01); *Y02T 10/7077* (2013.01)

(56) References Cited

U.S. PATENT DOCUMENTS

| | | | |
|---|---|---|---|
| 2012/0052367 A1 | 3/2012 | Hwang | |
| 2012/0164490 A1* | 6/2012 | Itoi | H01M 2/105 |
| | | | 429/7 |
| 2013/0169038 A1* | 7/2013 | King | B60L 3/0046 |
| | | | 307/10.1 |

FOREIGN PATENT DOCUMENTS

| | | |
|---|---|---|
| DE | 10 2007 010 748 A1 | 8/2008 |
| DE | 10 2008 052 284 A1 | 4/2010 |
| DE | 10 2008 043 784 A1 | 5/2010 |
| DE | 10 2009 035 488 A1 | 2/2011 |
| EP | 2 434 562 A1 | 3/2012 |
| JP | 6-502738 | 3/1994 |
| JP | 2006-134801 | 5/2006 |
| JP | 2009-529417 | 8/2009 |
| JP | 2012-028244 | 2/2012 |
| WO | WO 92/10006 | 6/1992 |
| WO | WO 2012/014398 A1 | 2/2012 |

* cited by examiner

1

SYSTEM FOR THE STORAGE OF ELECTRIC ENERGY FOR A VEHICLE WITH ELECTRIC PROPULSION AND HAVING CYLINDRICAL CHEMICAL BATTERIES CONNECTED TO EACH OTHER IN PARALLEL AND IN SERIES BY MEANS OF U-SHAPED RIGID CONNECTION ELEMENTS

FIELD OF THE INVENTION

The present invention relates to a system for the storage of electric energy for a vehicle with electric propulsion.

The present invention is advantageously applied in a road vehicle with hybrid propulsion to which the following description will explicitly refer without losing in generality.

PRIOR ART

A hybrid vehicle comprises an internal combustion heat engine, which transmits the driving torque to the driving wheels through a transmission provided with a gearbox, and at least one electric machine which is mechanically connected to the driving wheels and is electrically connected to a system for the storage of electric energy. Normally, the system for the storage of electric energy comprises a pack of chemical batteries which are connected to each other in series and in parallel.

Patent application IT2012BO00056 describes a system for the storage of electric energy for a vehicle with electric propulsion; the storage system is provided with a pack of chemical batteries connected to each other in series and in parallel, each of which has a cylindrical shape having a central symmetry axis and is provided with a respective electrochemical cell. The chemical batteries are arranged in a support matrix made of plastic material which provides a mechanical support to the chemical batteries themselves.

In patent application IT2012BO00056, the chemical batteries of a same row are connected to one another in parallel while the various rows of chemical batteries are connected to one another in series; in particular, each row of chemical batteries has a positive electric manifold which is electrically connected to all the positive poles of the chemical batteries of the row through corresponding positive conductors, and has a negative electric manifold which is electrically connected to all the negative poles of the chemical batteries of the row through corresponding negative conductors. However, the above-described electrical connection method of the chemical batteries has some drawbacks, since it does not allow a high overall electric voltage to be obtained at the terminals of the storage system by connecting all the chemical batteries of a same row to one another in parallel, and it is particularly difficult (and thereby expensive) to be implemented.

DESCRIPTION OF THE INVENTION

The object of the present invention is to provide a system for the storage of electric energy for a vehicle with electric propulsion, which storage system is free from the above-described drawbacks while being easy and cost-effective to be implemented.

According to the present invention, a system for the storage of electric energy for a vehicle with electric propulsion is provided according to the appended claims.

BRIEF DESCRIPTION OF THE DRAWINGS

The present invention will now be described with reference to the accompanying drawings, which show a non-limiting example thereof, in which.

PREFERRED EMBODIMENTS OF THE INVENTION

Figure 1:
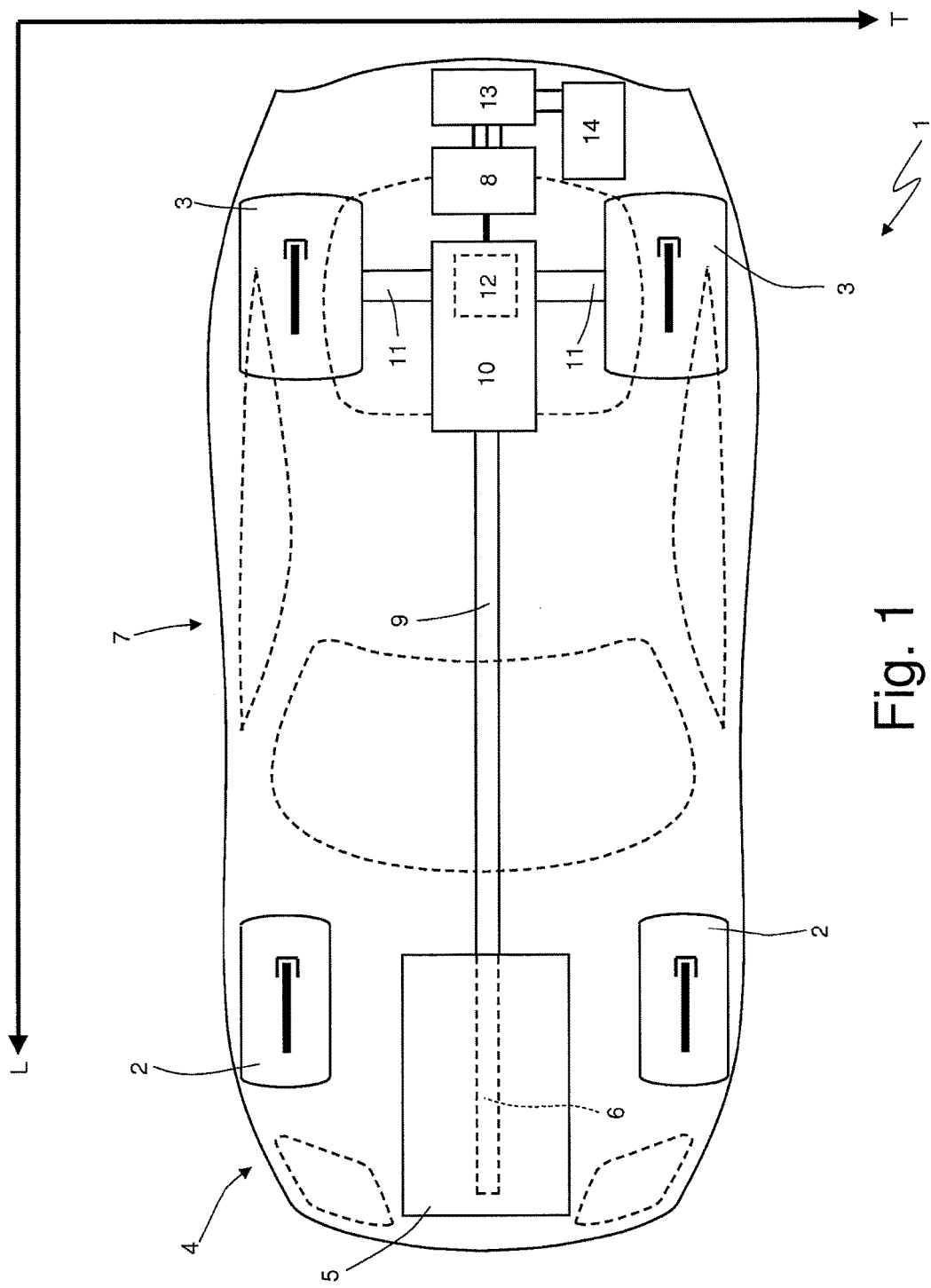
FIG. 1 shows a diagrammatic plan view of a road vehicle with hybrid propulsion.

In FIG. 1, reference numeral 1 indicates as a whole a road vehicle with hybrid propulsion provided with two front wheels 2 and two rear driving wheels 3 which receive the driving torque from a hybrid motor propulsion system 4.

Vehicle 1 has a longitudinal direction L parallel to the direction of the rectilinear motion (i.e. to the direction of motion with null steering angle) and a transverse direction T perpendicular to the longitudinal direction L.

The hybrid motor propulsion system 4 comprises an internal combustion heat engine 5 which is arranged in front position and is provided with a driving shaft 6, an automatic transmission 7, which transmits the driving torque generated by the internal combustion engine 5 to the rear driving wheels 3, and an electric machine 8 which is mechanically connected to transmission 7 and is reversible (i.e. it can work both as an electric motor, absorbing electric energy and generating a mechanical driving torque, and as electric generator, absorbing mechanical energy and generating electric energy).

Transmission 7 comprises a drive shaft 9 which on one side is angularly integral to driving shaft 6 and on the other side is mechanically connected to a dual clutch gearbox 10, which is arranged in rear position and transmits the motion to the rear driving wheels 3 by means of two axle shafts 11 which receive the motion from a differential gear 12. The main electric machine 8 is mechanically connected to gearbox 10 and in particular, it is angularly integral to a primary shaft of gearbox 10; as regards the methods of connecting the main electric machine 8 to the dual clutch gearbox 10, reference will be made, for example, to the description of patent application EP2325034A1.

Figure 2:
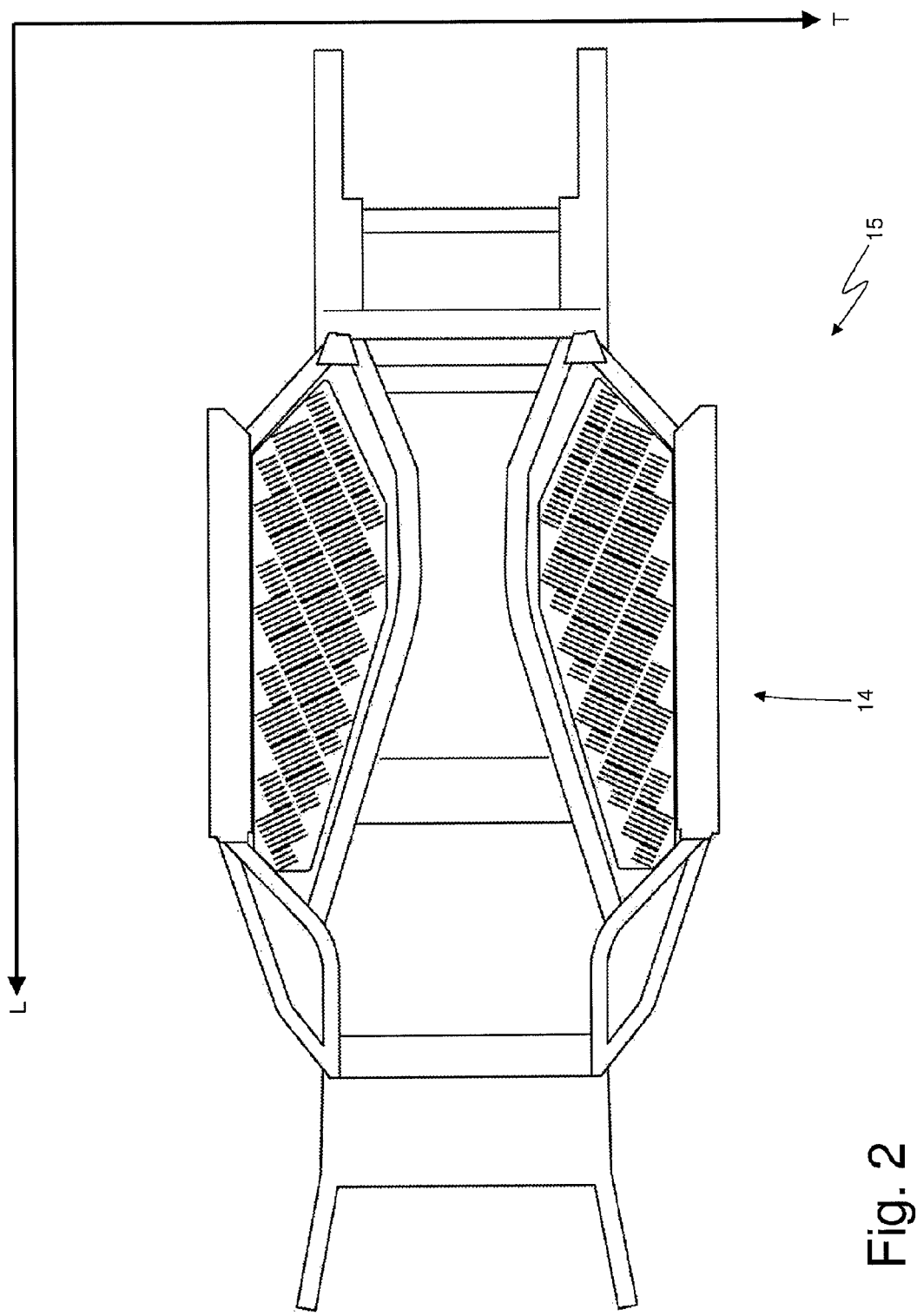
FIG. 2 shows a diagrammatic plan view of a frame of the road vehicle in FIG. 1 with a system for the storage of electric energy implemented according to the present invention highlighted.
Figure 3:
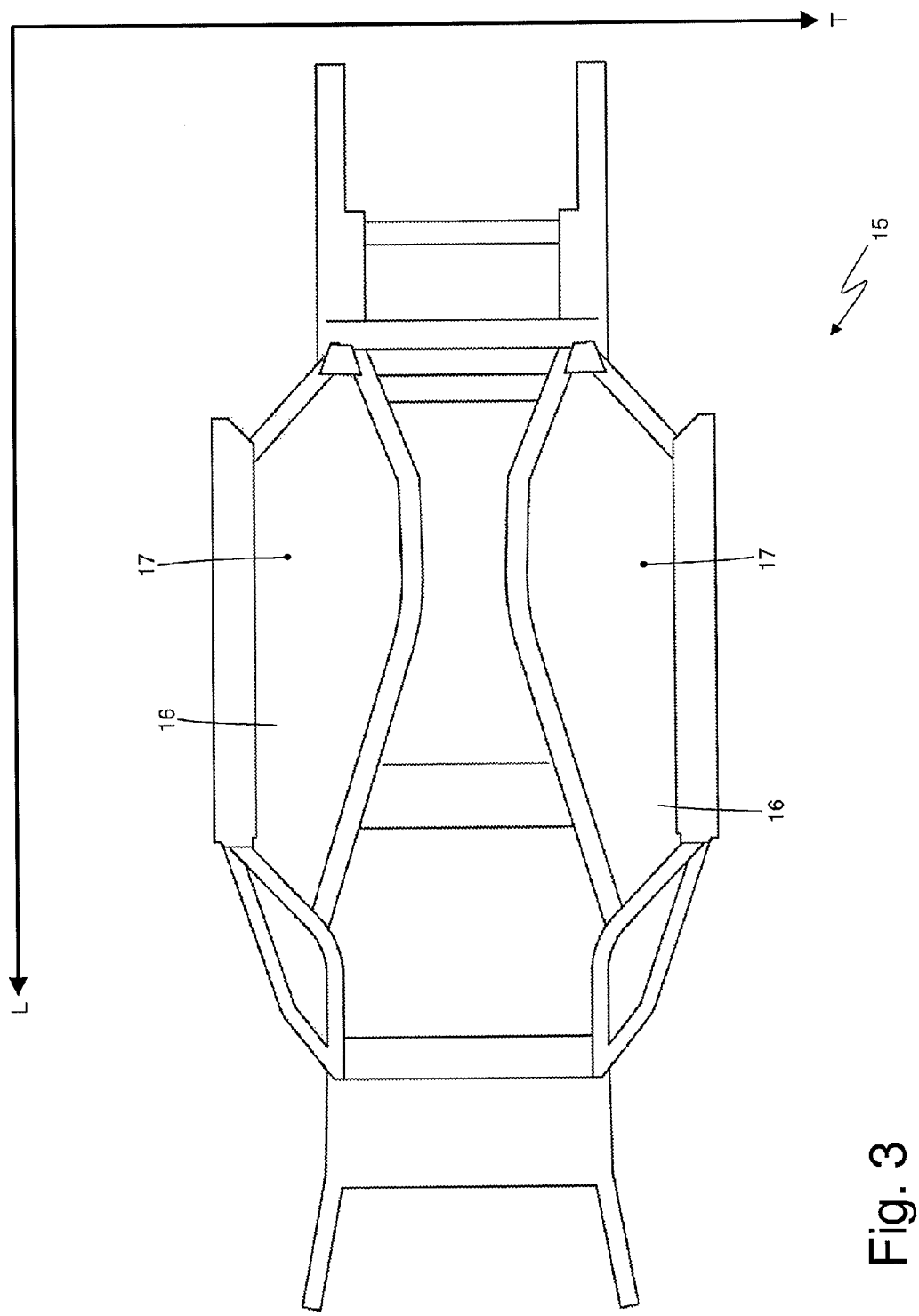
FIG. 3 shows a diagrammatic plan view of the frame in FIG. 2 without the system for the storage of electric energy.
Figure 4:
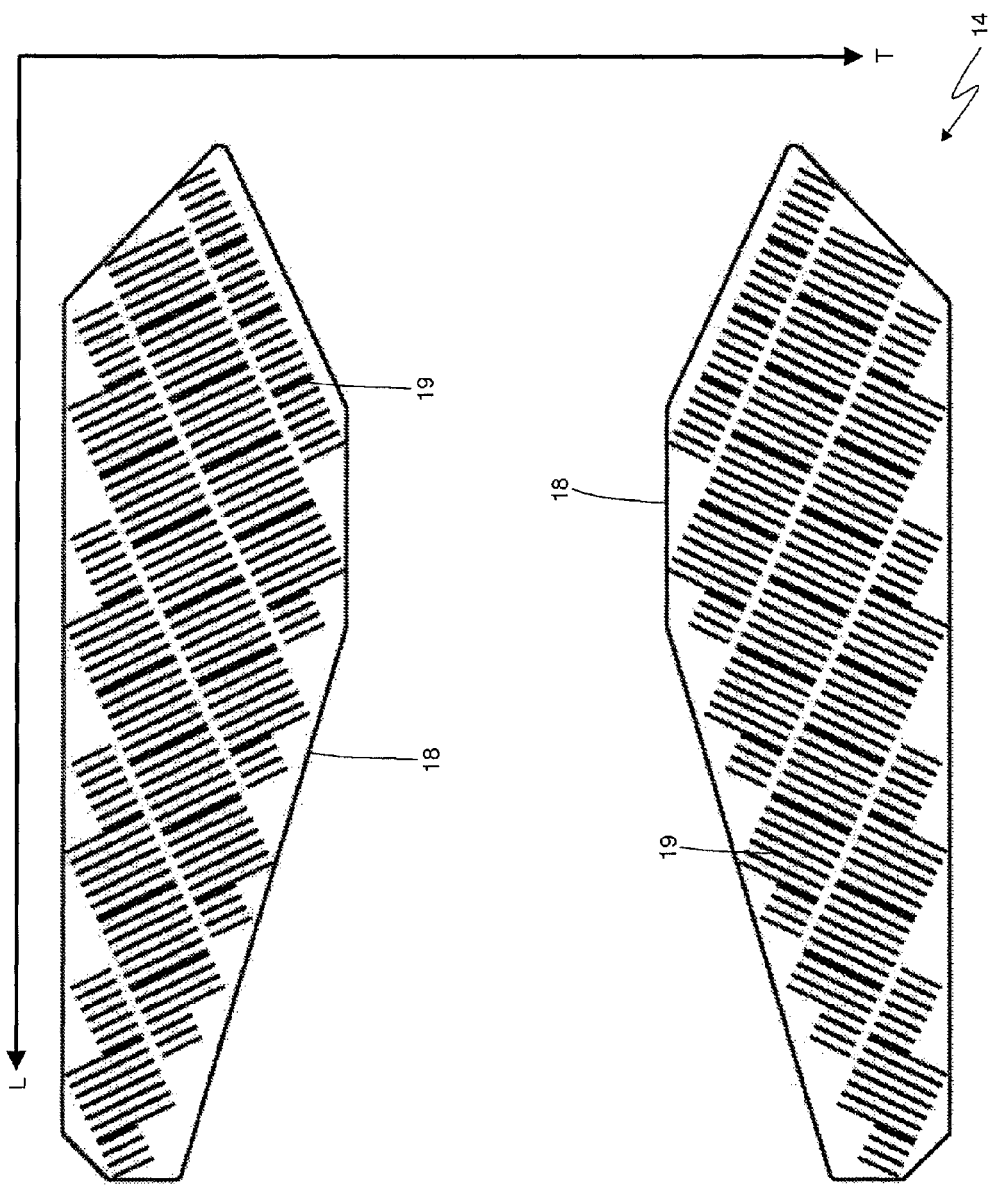
FIG. 4 shows a diagrammatic plan, enlarged scale view of just the system for the storage of electric energy in FIG. 2.

As shown in FIGS. 2 and 3, road vehicle 1 is provided with a frame 15 comprising a floor 16 (partially and diagrammatically shown in FIG. 3) which constitutes a bottom wall of the compartment; two housings 17 (shown in FIG. 3) are obtained in floor 16 which house the storage system 14 (therefore, the storage system 14 lies on floor 16). The storage system 14 comprises two, containers 18 (typically made of plastic material which is thermally conductive and electrically insulating), each of which is inserted in a corresponding housing 17 and therefore has the same shape as housing 17 itself.

A pack of chemical batteries 19 is arranged in each container 18, which chemical batteries are connected to one another in parallel and in series and comprise respective electrochemical cells 20 (diagrammatically shown in FIGS. 7 and 8) which are adapted to convert the chemical energy stored in electric energy and vice versa. According to a preferred embodiment, the electrochemical cells 20 are the lithium-ion ("Li-Ion") ones.

Figure 5:
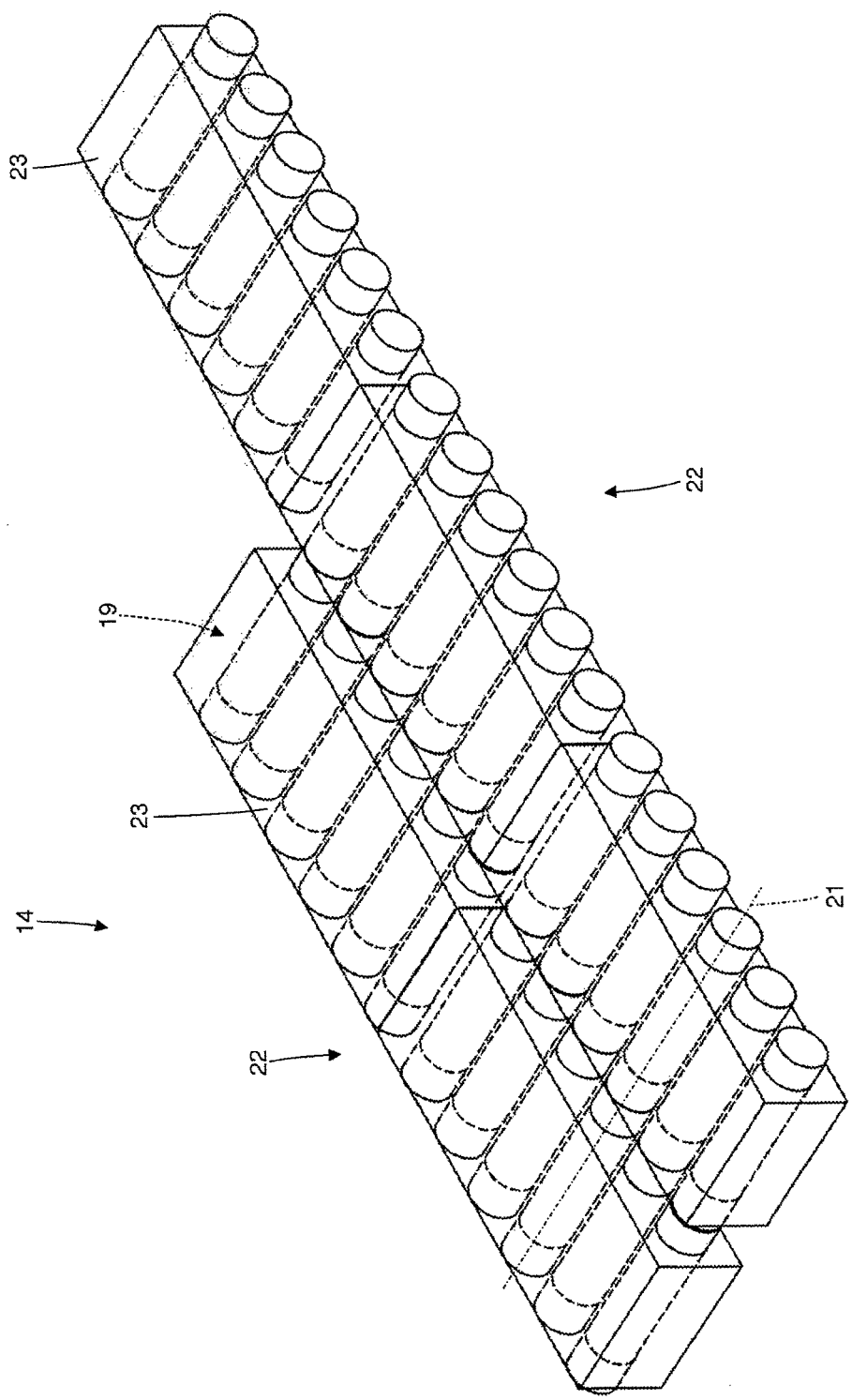
FIG. 5 shows a diagrammatic, perspective view of some modules of chemical batteries which make up the system for the storage of electric energy in FIG. 2.

As shown in FIG. 5, each chemical battery 19 has a cylindrical shape having a central symmetry axis 21 and has a positive pole at one end and a negative pole at an opposite end. The storage system 14 is shaped so as to be fitted inside vehicle 1 in such a way that the central symmetry axis 21 of each chemical battery 19 is not parallel either to the longitudinal direction L of vehicle 1 or to the transverse direction T of vehicle 1.

As shown in FIG. 5, the chemical batteries 5 are arranged in rows 22 parallel to one another and are arranged on a single layer (i.e. no chemical battery 19 has another chemical battery 19 arranged on top or beneath itself); according to a different embodiment not shown, the pack of chemical batteries 19 has two or more layers of chemical batteries 19 arranged one on top of the other. In each row 22, all the chemical batteries 19 of row 22 are parallel to one another and are arranged one next to the other at a predetermined pitch in such a way that row 22 develops perpendicularly to the central symmetry axes 21 of the chemical batteries 19.

Figure 6:
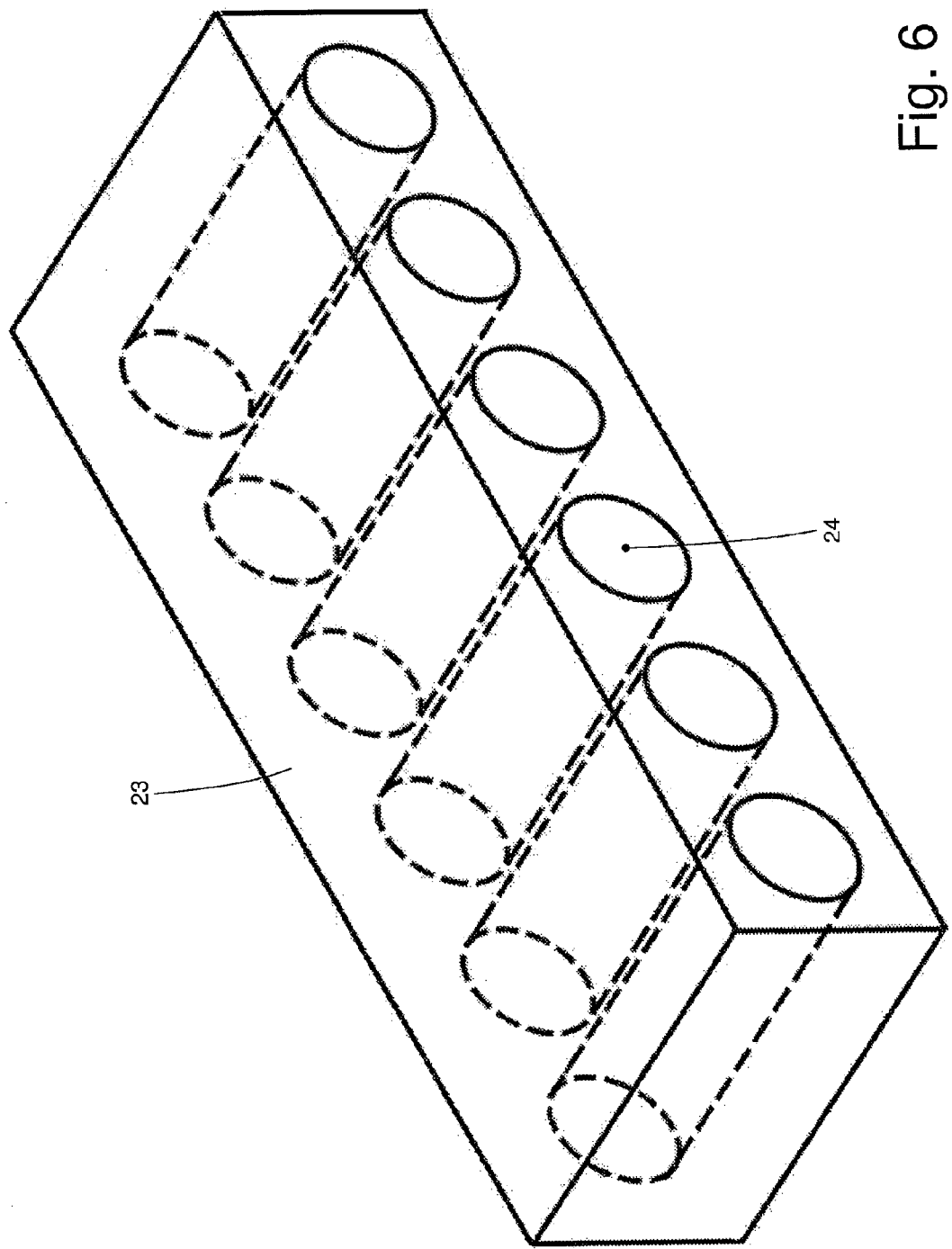
FIG. 6 shows a diagrammatic, perspective view of a support matrix made of plastic material of the system for the storage of electric energy in FIG. 2.

As shown in FIGS. 5 and 6, the storage system 14 comprises a support matrix 23 made of a plastic material inside which the chemical batteries 19 are arranged. In particular, the support matrix 23 has the shape of a rectangular parallelepiped having a plurality of through holes 24, each of which is adapted to receive and contain a corresponding chemical battery 19 which is axially inserted into the through hole 24. In this embodiment, only a central portion of each chemical battery 19 is engaged by the support matrix 23 (i.e. is arranged in the support matrix 23 in the corresponding through hole 24), while the two end portions of each chemical battery 19 (in which the two positive and negative electric poles are arranged) protrude from the support matrix 23. The support matrix 23 is implemented separately and independently of the chemical batteries 19 (the "empty" support matrix 23 looks as shown in FIG. 6) and the chemical batteries 19 are inserted at a later time into the through holes 24 of the support matrix 23 which has been previously implemented. The two end portions of each chemical battery 19 protrude from the support matrix 23; thus, the electrical and safety connections of the chemical batteries 19 are implemented after inserting the chemical batteries 19 into the support matrix 23 since the end portions of each chemical battery 19 are completely accessible from the outside.

According to a preferred embodiment shown in FIG. 5, the support matrix 23 is not a single body which carries all the chemical batteries 19 of the pack of batteries, but is implemented in a modular way by arranging multiple modules of the support matrix 23 next to one other, each of which carries a predetermined number of chemical batteries 19 (six chemical batteries 19 in the example shown in FIGS. 5 and 6). In other words, the support matrix 23 is composed in a modular way by the union of multiple modules which are identical to each other and each carry a same number of chemical batteries 19 (as an alternative, different types of modules differentiated from each other may be provided rather than a single type of module). In this way, it is easy to adapt the overall shape of the support matrix 23 to the (normally irregular) shape of container 18 of the storage system 14.

Figure 7:
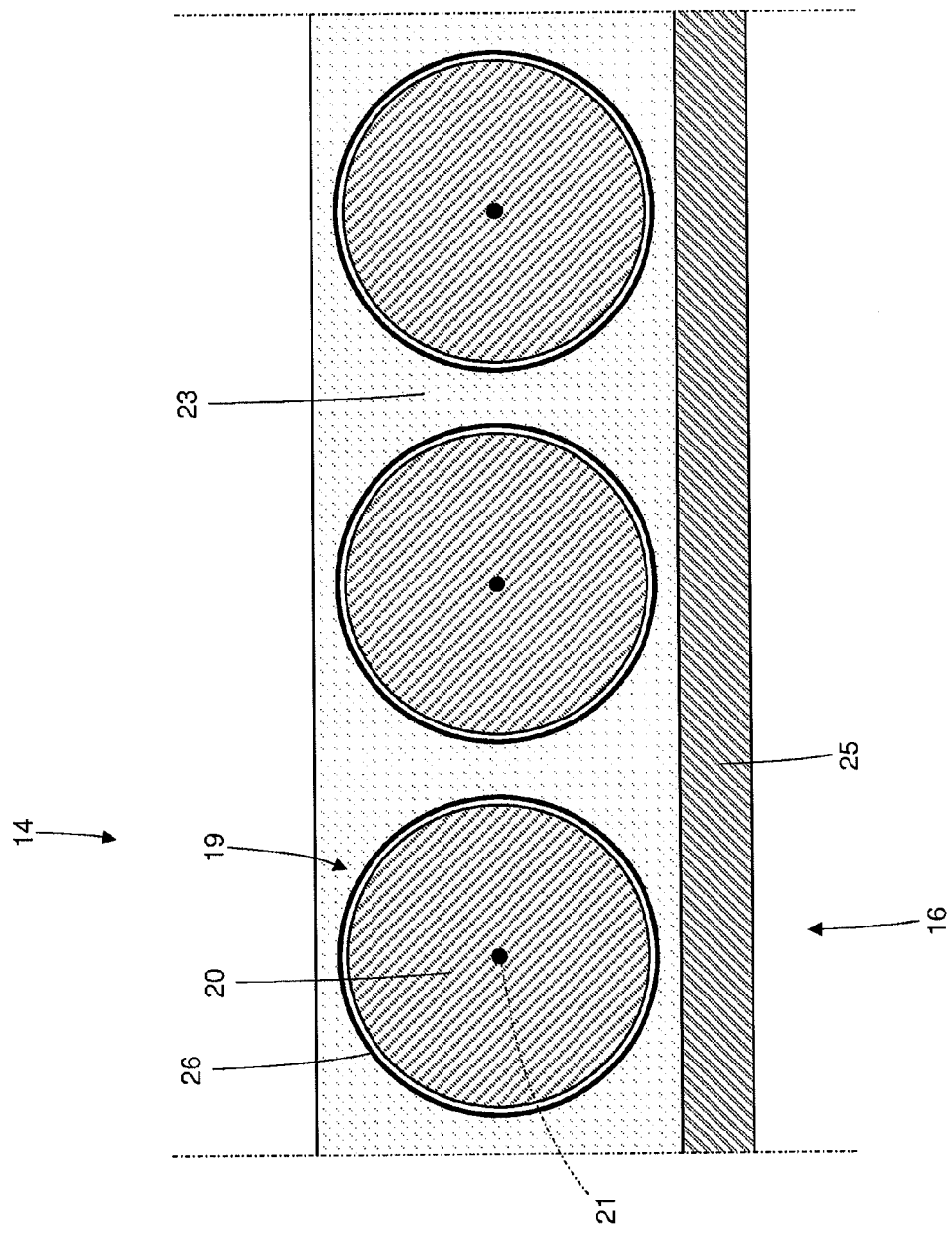
FIG. 7 shows a diagrammatic cross-sectional view of a detail of the system for the storage of electric energy in FIG. 5.
Figure 8:
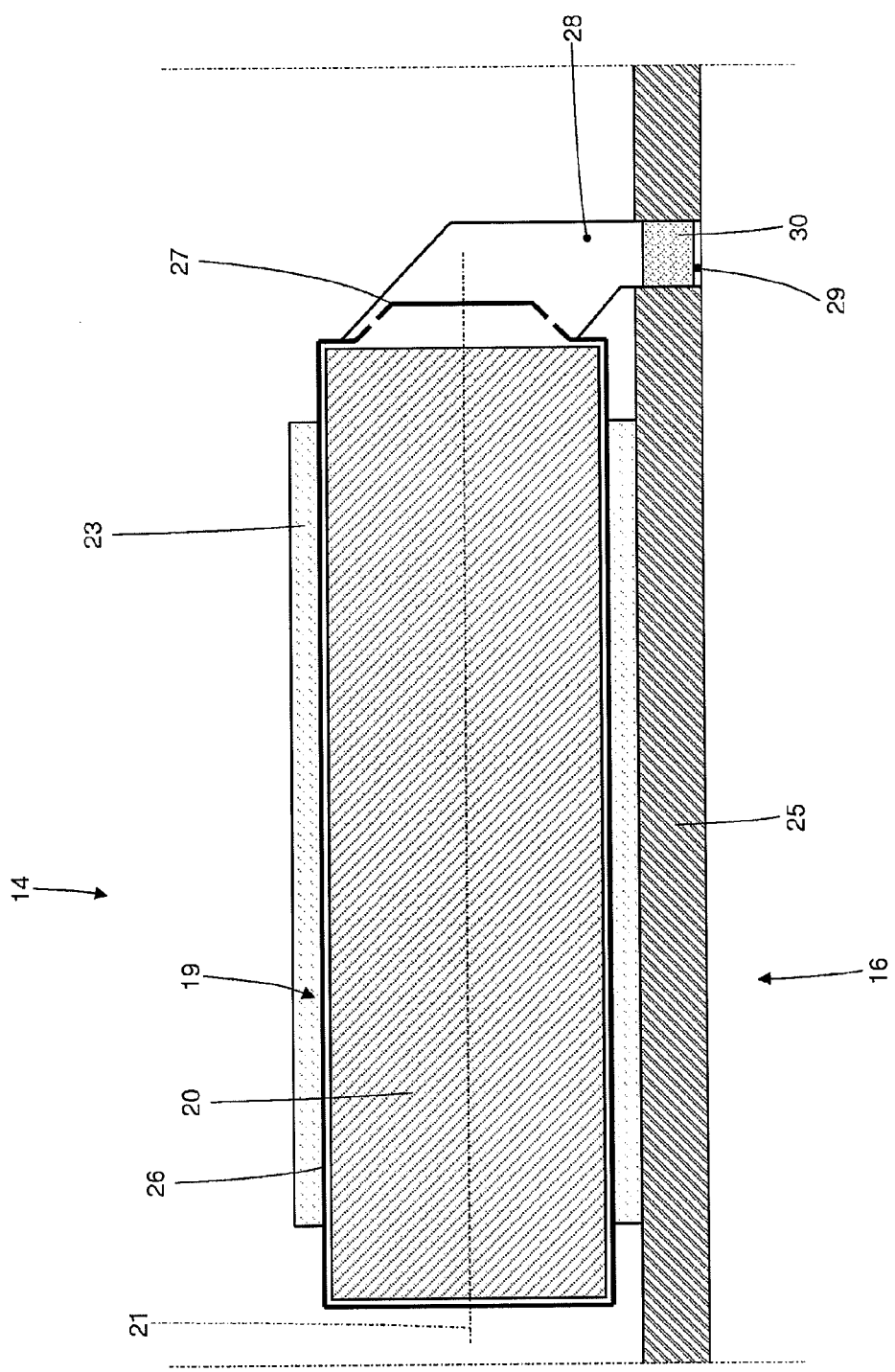
FIG. 8 shows a diagrammatic longitudinal sectional view of a detail of the system for the storage of electric energy in FIG. 5.

As shown in FIGS. 7 and 8, a bottom surface of the support matrix 23 lies on a bottom panel 25 of floor 16. Each chemical battery 19 comprises an electrochemical cell 20 having a cylindrical shape, and an outer shell 26, which has a cylindrical shape, houses in its inside the electrochemical cell 20 keeping the electrochemical cell 20 itself compressed, and is made of a material with a high mechanical strength. Each chemical battery 19 is provided with safety valve 27 (i.e. a venting or overpressure valve) which is arranged at a base of the outer shell 26 and is adjusted to open up when the pressure into the outer shell 26 exceeds a predetermined safety pressure; in other words, the safety valve 27 is a mechanical maximum pressure valve which opens up when the pressure into the outer shell 26 is too high to prevent a violent explosion of the outer shell 26 itself. Each chemical battery 19 is provided with an outlet duct 28, which connects the safety valve 27 to an evacuation opening 28 obtained through the bottom panel 25 of floor 16; preferably, each evacuation opening 29 is closed by an adjusted plug 30, which is set to come off in the presence of a pressure that is higher than a predetermined threshold.

Figure 11:
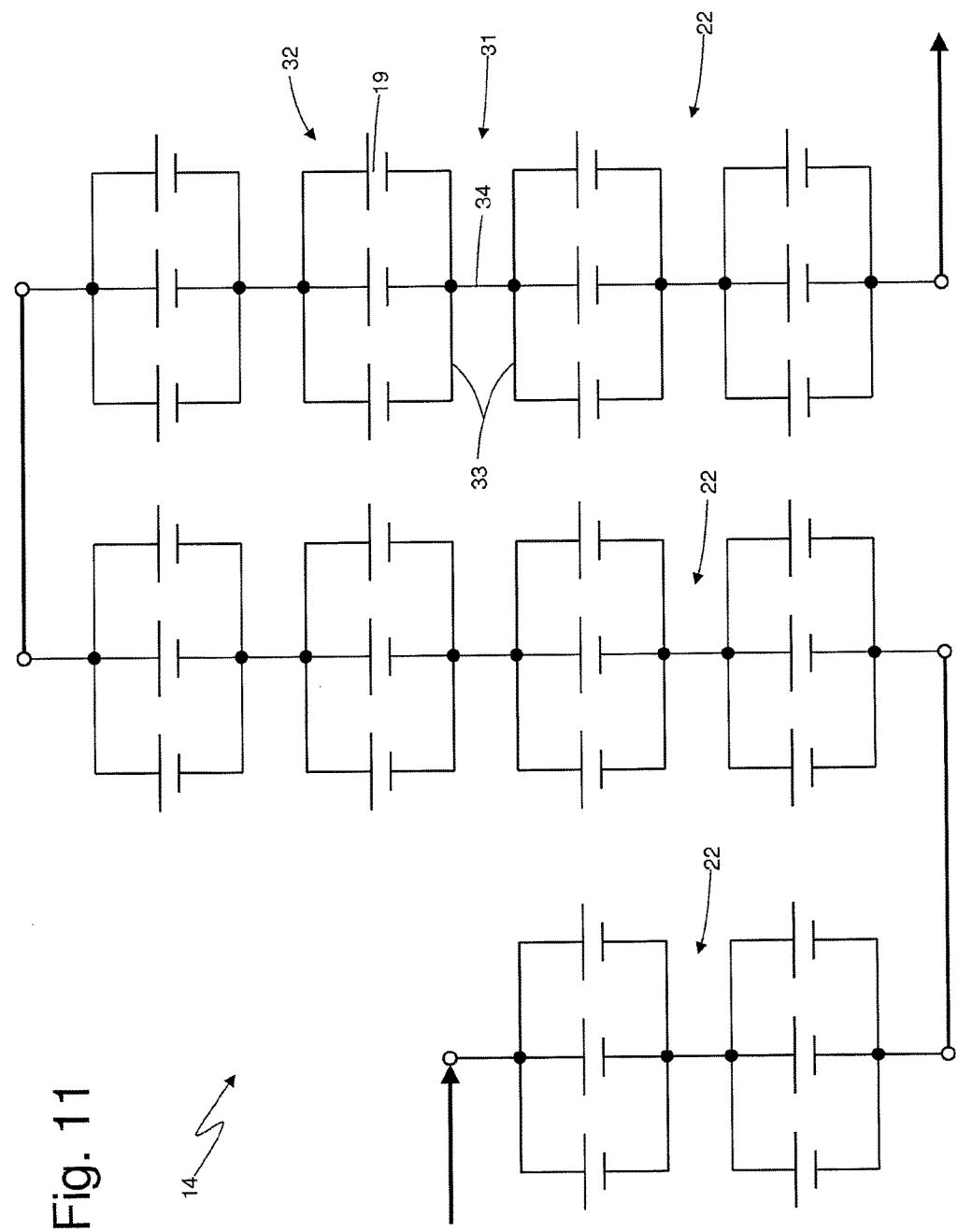
FIG. 11 shows a wiring diagram which shows the parallel and series connections between the chemical batteries of some rows of chemical batteries.

FIG. 11 shows the wiring diagram of the parallel and series connections in the case of a storage system 14 in which the chemical batteries 19 are distributed on three rows 22 (in FIG. 11, the three rows 22 are differentiated, i.e. a first row is shorter and consists of six chemical batteries 19, while the other two rows are longer and each consists of twelve chemical batteries 19). A plurality of electrical connection elements 31 are provided for connecting the poles of the chemical batteries 19 of a same row 22, so as to create a sequence of groups 32 of chemical batteries 19 (in the accompanying figures, consisting of three chemical batteries 19), in which the chemical batteries 19 are connected to one another in series; in other words, in each group 32 of chemical batteries 19 (in the accompanying figures, consisting of three chemical batteries 19), the chemical batteries 19 are connected to one another in parallel and the various groups 32 of chemical batteries 19 are connected to one another in series. Preferably, as shown in FIG. 11, rows 22 of chemical batteries 19 are connected to one another in series but alternatively, rows 22 of chemical batteries 19 may also be (wholly or partly) connected to one another in parallel.

Figure 9:
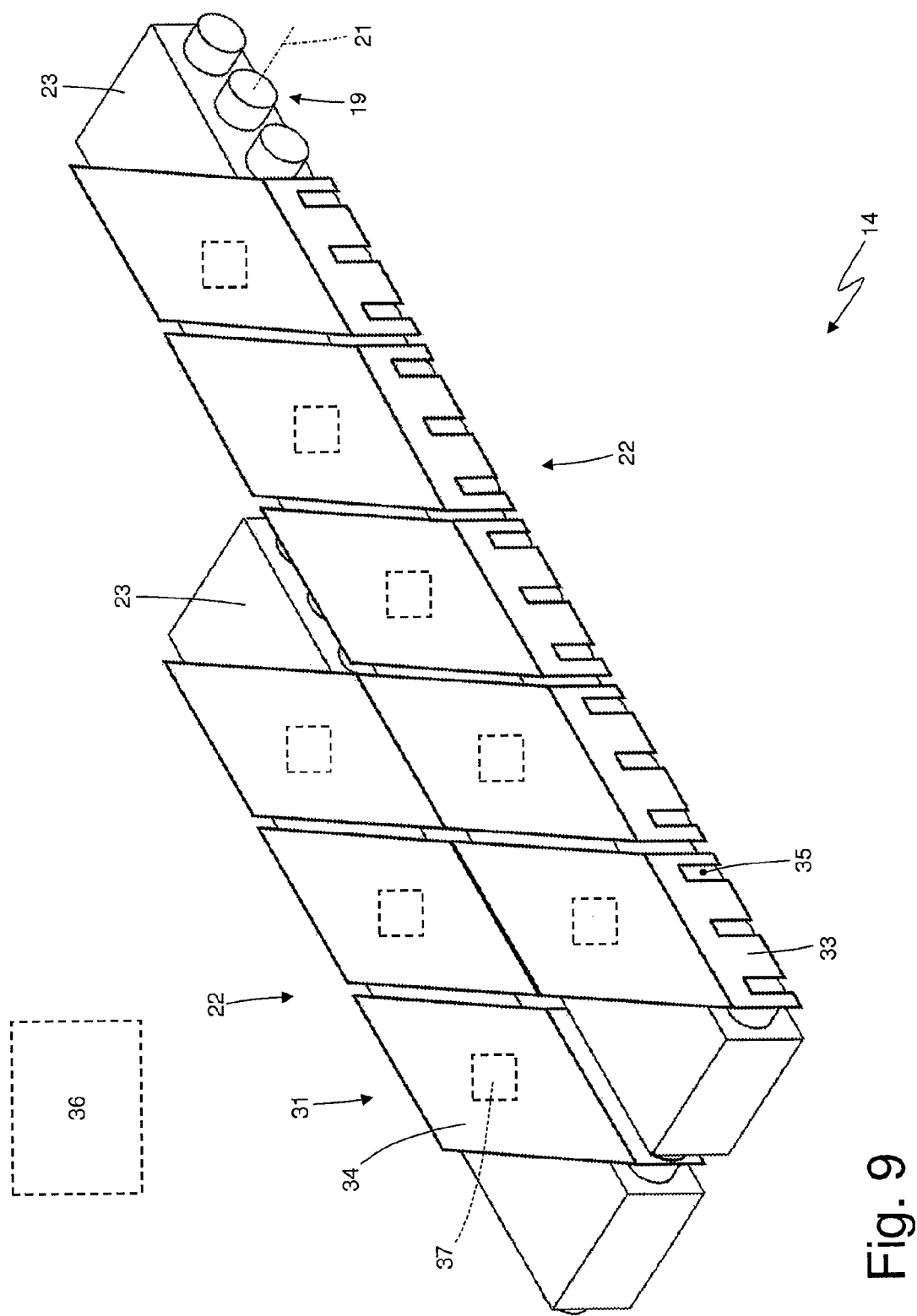
FIG. 9 shows a diagrammatic, perspective view of some modules of chemical batteries which make up the system for the storage of electric energy in FIG. 2 with the parallel and series electrical connections between the chemical batteries highlighted.
Figure 10:
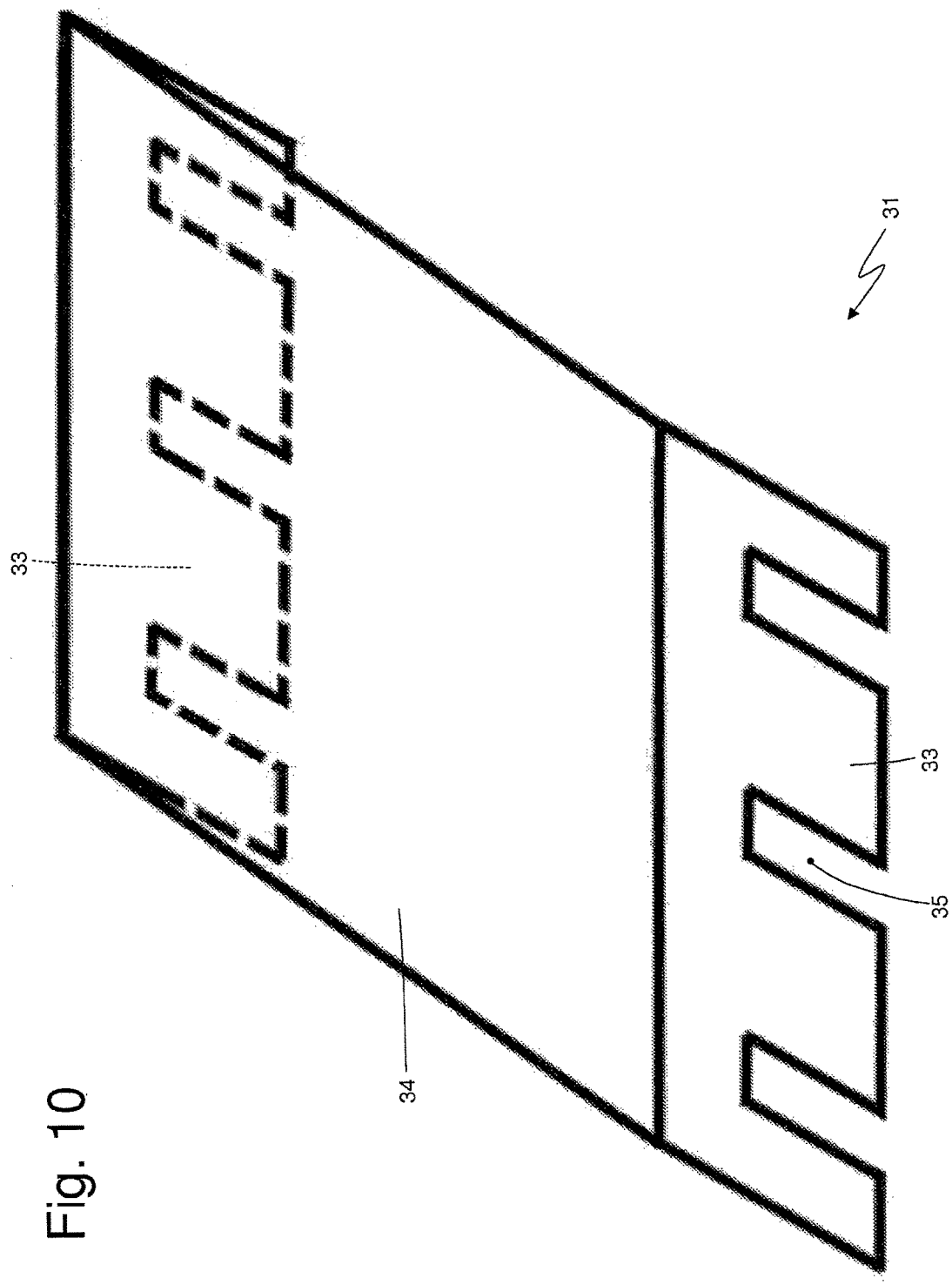
FIG. 10 shows a diagrammatic, perspective view of a rigid, U-shaped connection element which connects two side-by-side groups of chemical batteries to each other in series and in parallel.

As shown in FIGS. 9 and 10, each electrical connection element 31 consists of a rigid body made of an electrical conductor material (typically a metal material such as copper or aluminum), is U-shaped, and comprises a first head plate 33, which is electrically connected to the positive poles of the chemical batteries 19 of a same first group 32 of chemical batteries 19, a second head plate 33 which is electrically connected to the negative poles of the chemical batteries 19 of a same second group 32 of chemical batteries 19 adjacent to the first group 32 of chemical batteries 19, and a bridge plate 34, which connects the two head plates 33 to each other by extending above (or under, according to a different embodiment not shown) the chemical batteries 19 of the two groups 32 of chemical batteries 19. Accordingly, the bridge plate 34 of each electrical connection element 31 lies on a (top or bottom) wall of the support matrix 23.

According to a preferred embodiment, in each electrical connection element 31, at least one head plate 33 has through openings 35, which are arranged at the safety valves 27 of the corresponding chemical batteries 19; the function of the through openings 35 is to prevent the mechanical interference between the head plate 33 and the safety valves 27 of the corresponding chemical batteries 19.

The support matrix 23 has a mechanical strength which is lower than the mechanical strength of the single chemical batteries 19 and is adjusted so as to get deformed in case of (violent) crash. In other words, the support matrix 23 is sized to have a sufficiently high mechanical strength (with an adequate safety margin) to withstand the stresses of the standard drive (either resulting from accelerations or from vibrations), but not sufficiently high to withstand the stresses that occur in case of crash (obviously of a certain seriousness, not for example a simple rear collision at low speed). In any case, it is essential for the mechanical strength of the support matrix 23 to be (significantly) smaller than the mechanical strength of the single chemical batteries 19, since in case of serious crash it is admissible (or, it is desirable) if the support matrix 23 gets deformed (normally breaking up), but leaving the single chemical batteries 19 entire.

Likewise, each head plate 33 is mechanically connected to the poles of the corresponding chemical batteries 19 by means of a mechanical connection which has a mechanical strength that is adjusted so as to cause the interruption of the connection in case of crash which causes a deformation of the storage system 14 and thereby, as described above, a displacement of a part of the chemical batteries 19 from their natural seat (due to a mechanical collapse of the support matrix 23); in this way, the electric continuity between the chemical batteries 19 is at least partly interrupted, i.e. the chemical batteries 19 that are displaced automatically disconnect from the electric circuit, thus reducing the risk of short-circuits or electrocution. Therefore, after the crash there are many chemical batteries 19 not connected to one another, thus individually having a moderate electric voltage.

According to a possible embodiment, in each electrical connection element 31, the two head plates 33 are only lying on the poles of the corresponding chemical batteries 19; in this embodiment, preferably, in each electrical connection element 31, the two head plates 33 are pressed against the poles of the corresponding chemical batteries 19 by a spring-back force generated by a deformation of the electrical connection element 31 that is established when the electrical connection element 31 is coupled to the chemical batteries 19. In other words, each electrical connection element 31 gets slightly elastically deformed when it is coupled to the chemical batteries 19 and such elastic deformation generates a spring-back force which pushes the two head plates 33 against the poles of the chemical batteries 19.

According to an alternative embodiment (which may also be combined with the above-described spring pressure), in each electrical connection element 31, the two head plates 33 are welded to the poles of the corresponding chemical batteries 19 by means of a welding material having a low mechanical resistance (such as by means of tin).

According to a preferred embodiment shown in FIG. 9, the storage system 14 comprises a central control unit 36 which controls all the storage system 14, and a plurality of local control devices 37 which are connected to the central control unit 36. Each local control device 37 is associated with a corresponding group 32 of chemical batteries 19, controls the operation of the chemical batteries 19, and operates according to a master-slave mode with the central control unit 36. Preferably, in each group 32 of chemical batteries 19, the local control device 37 is mechanically supported by the bridge plate 34 of the corresponding electrical connection element 31. Typically, in each group 32 of chemical batteries 19, the local control device 37 determines, for each chemical battery 19 (or for each group 32 of chemical batteries 19), the electric voltage at the ends of the two poles, the intensity of the electric current flowing through the two poles, and/or the temperature of a corresponding electrochemical cell 20.

According to a possible embodiment, a cooling system is provided which is thermally coupled to the bridge plates 34 of the electrical connection elements 31; in fact, the electrical connection elements 31 are normally made of a metal material (copper or aluminum) which is also thermally conductor. For example, the cooling system may comprise coils which are crossed by a cooling fluid circulated by a pump and lying on the top surface of the bridge plates 34; typically, a thin layer of plastic material is interposed between the coils of the cooling system and the bridge plates 34, which plastic material is electrically insulating and thermally conductor.

The above-described system 14 for the storage of electric energy has several advantages.

Firstly, in the system 14 for the storage of electric energy, the electrical connection method of the chemical batteries 19 through the electrical connection elements 31 allows a high overall electric voltage to be obtained at the terminals of the storage system 14 since the series connection (which adds up the single electric voltages) prevails in a same row 22 as compared to the parallel connection.

Moreover, in the system 14 for the storage of electric energy, the electrical connection method of the chemical batteries 19 through the electrical connection elements 31 is very simple and inexpensive both as componentry and as assembly. In fact, the electrical connection elements 31 are all equal to one another and have a very simple shape; moreover, during assembly, the electrical connection elements 31 are coupled almost "joint-wise" to the corresponding chemical batteries 19 by means of a movement that is easily automated.

The invention claimed is:

1. A system for the storage of electric energy for a vehicle with electric propulsion, the storage system comprises:
   a pack of chemical batteries, each of which has a cylindrical shape having a central symmetry axis and presents, at one end, a positive pole and, at an opposite end, a negative pole; the batteries are arranged in at least one row, in which all the chemical batteries of the row are parallel to each other and are arranged one next to the other with a predetermined pitch, so that the row develops perpendicular to the central symmetry axes of the chemical batteries; and
   a plurality of electrical connection elements for connecting the poles of the chemical batteries of a same row, so as to create a sequence of groups of chemical batteries, in which the chemical batteries are connected to each other in parallel, and so as to connect the groups of chemical batteries to each other in series;

wherein all the chemical batteries have the same orientation so that all the positive poles are arranged on a first side of the pack and all the negative poles are arranged on a second side of the pack opposite to the first side of the pack;

wherein each electrical connection element consists of a rigid body made of an electrical conductor material, is U-shaped, and comprises a first head plate, which is electrically connected to the positive poles of the chemical batteries of a same first group of chemical batteries, a second head plate, which is electrically connected to the negative poles of the chemical batteries of a same second group of chemical batteries adjacent to, and different from, the first group of chemical batteries, and a bridge plate, which connects the two head plates to each other by extending above or under the chemical batteries of the two groups of chemical batteries; and wherein, in each rigid body, the first head plate is arranged on the first side of the pack at which the positive poles are arranged and the second head plate is arranged on the second side, opposite to the first side, of the pack at which the negative poles are arranged.

2. A storage system according to claim 1, wherein:
each chemical battery presents a safety valve, which is arranged next to a pole of the chemical battery; and
in each electrical connection element, at least one head plate presents through openings, which are arranged in correspondence to the safety valves of the corresponding chemical batteries.

3. A storage system according to claim 1, wherein each group of chemical batteries comprises a local control device, which controls the operation of the corresponding chemical batteries.

4. A storage system according to claim 3, wherein, in each group of chemical batteries, the local control device is mechanically supported by the bridge plate of the corresponding electrical connection element.

5. A storage system according to claim 3, wherein, in each group of chemical batteries, the local control device determines, for each chemical battery, the electric voltage at the ends of the two poles, the intensity of the electric current flowing through the two poles, and/or the temperature of a corresponding electrochemical cell.

6. A storage system according to claim 3 and comprising a central control unit, which controls the whole storage system, is connected to the local control devices, and operates according to a master-slave mode with the local control devices themselves.

7. A storage system according to claim 1, wherein:
a support matrix made of plastic material is provided, inside which the chemical batteries are arranged; and
the bridge plate of each electrical connection element lies on a wall of the support matrix.

8. A storage system according to claim 7, wherein the support matrix presents a mechanical strength, which is lower than the mechanical strength of the single chemical batteries and is adjusted so as to cause the deformation of the support matrix in case of crash.

9. A storage system according to claim 1, wherein each head plate is mechanically connected to the poles of the corresponding chemical batteries by means of a mechanical connection, which presents a mechanical strength that is adjusted so as to cause the interruption of the connection in case of crash.

10. A storage system according to claim 9, wherein, in each electrical connection element, the two head plates simply lay against the poles of the corresponding chemical batteries.

11. A storage system according to claim 10, wherein, in each electrical connection element, the two head plates are pressed against the poles of the corresponding chemical batteries by a spring-back force generated by a deformation of the electrical connection element that is established when the electrical connection element is coupled to the chemical batteries.

12. A storage system according to claim 9, wherein, in each electrical connection element, the two head plates are welded to the poles of the corresponding chemical batteries.

13. A storage system according to claim 1 and comprising a cooling system, which is thermally coupled to the bridge plates of the electrical connection elements.

* * * * *